(12) United States Patent
Fastert et al.

(10) Patent No.: US 11,667,077 B2
(45) Date of Patent: Jun. 6, 2023

(54) CONVEYING INSTALLATION AND TOOL HEAD FOR AN ADDITIVE MANUFACTURING MACHINE, AND ADDITIVE MANUFACTURING MACHINE

(71) Applicant: Airbus Operations GmbH, Hamburg (DE)

(72) Inventors: Claus Fastert, Hamburg (DE); Johannes Born, Hamburg (DE); Konstantin Schubert, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 199 days.

(21) Appl. No.: 16/903,498

(22) Filed: Jun. 17, 2020

(65) Prior Publication Data

US 2020/0398486 A1 Dec. 24, 2020

(30) Foreign Application Priority Data

Jun. 19, 2019 (DE) .................... 10 2019 116 693.4

(51) Int. Cl.
*B29C 64/209* (2017.01)
*B29C 48/285* (2019.01)
(Continued)

(52) U.S. Cl.
CPC ........ *B29C 64/232* (2017.08); *B29C 48/2886* (2019.02); *B29C 48/2888* (2019.02);
(Continued)

(58) Field of Classification Search
CPC ... B29C 64/118; B29C 64/209; B29C 64/321; B29C 64/232; B29C 48/285; B29C 48/2886; B29C 48/2888; B33Y 30/00
See application file for complete search history.

(56) References Cited

U.S. PATENT DOCUMENTS 5,340,433 A * 8/1994 Crump .................. G05B 19/41
156/218
10,016,997 B1 7/2018 LeStrange et al.
(Continued)

FOREIGN PATENT DOCUMENTS

| DE | 102015122647 A1 | 6/2017 |
| DE | 102018108123 A1 | 10/2018 |
| WO | 2015073322 A1 | 5/2015 |

OTHER PUBLICATIONS

German Office Action; priority document.
European Search Report for corresponding European Patent Application No. 20180835 dated Dec. 1, 2020.

*Primary Examiner* — Philip C Tucker
*Assistant Examiner* — Jimmy R Smith, Jr.
(74) *Attorney, Agent, or Firm* — Greer, Burns & Crain, Ltd.

(57) ABSTRACT

For increasing the speed in 3D printing, for avoiding the conveying elements slipping from the conveyed semi-finished product, and for improving the transmission of force from the conveying elements to the semi-finished products to be conveyed, a conveying installation is provided for an additive manufacturing machine. The conveying installation for conveying a semi-finished product comprises a longitudinal conveying mechanism which by means of a periodic movement of at least one conveying element conveys the semi-finished product along a conveying direction which is parallel to the semi-finished product longitudinal axis. The conveying element when moving in the conveying direction acquires the semi-finished product, and when moving counter to the conveying direction is released from the semi-finished product. This results in a movement of the semi-finished product in the conveying direction.

13 Claims, 5 Drawing Sheets

(51) Int. Cl.
*B29C 64/321* (2017.01)
*B33Y 30/00* (2015.01)
*B29C 64/118* (2017.01)
*B29C 64/232* (2017.01)

(52) U.S. Cl.
CPC .......... *B29C 64/209* (2017.08); *B29C 64/321* (2017.08); *B29C 64/118* (2017.08); *B33Y 30/00* (2014.12)

(56) References Cited

U.S. PATENT DOCUMENTS

| | | |
|---|---|---|
| 2016/0038655 A1 | 2/2016 | Weisman et al. |
| 2018/0243985 A1* | 8/2018 | Frenock ................. B29C 64/209 |
| 2018/0370130 A1* | 12/2018 | Duffner .................. B29C 70/38 |
| 2019/0036337 A1 | 1/2019 | Zhang et al. |

* cited by examiner

CONVEYING INSTALLATION AND TOOL HEAD FOR AN ADDITIVE MANUFACTURING MACHINE, AND ADDITIVE MANUFACTURING MACHINE

CROSS-REFERENCES TO RELATED APPLICATIONS

This application claims the benefit of the German patent application No. 10 2019 116 693.4 filed on Jun. 19, 2019, the entire disclosures of which are incorporated herein by way of reference.

BACKGROUND OF THE INVENTION

The invention relates to a conveying installation for an additive manufacturing machine. The invention furthermore relates to a tool head for such a device and to an additive manufacturing machine.

A typical 3D printing application in the so-called fused filament fabrication (FFF) in which a thermoplastic filament is melted and applied to a printing bed uses plastics materials. The filament may contain additives or reinforcements. The filament cools down and re-solidifies on the printing bed.

An additive manufacturing machine which uses profile bars instead of filament is known from the not previously published German patent application 10 2019 108 123.8. The manufacturing machine disclosed therein uses a conventional gear wheel drive for conveying the profile bars.

SUMMARY OF THE INVENTION

The invention is based on an object of improving the production rate of additive manufacturing machines and the quality of components generated by additive manufacturing machines.

The invention achieves a conveying installation for an additive manufacturing machine, wherein the conveying installation is configured for conveying a semi-finished product which is composed of a manufacturing material that is to be processed by the additive manufacturing machine and has a semi-finished product longitudinal axis, wherein the conveying installation comprises a longitudinal conveying mechanism which for conveying the semi-finished product along a conveying direction which is parallel to the semi-finished product longitudinal axis is configured in such a manner that when moving in the conveying direction the semi-finished product is able to be acquired by virtue of a periodic movement of at least one conveying element, and when moving counter to the conveying direction is able to be released from the semi-finished product, so as to move the semi-finished product in the conveying direction.

It is preferable for the semi-finished product to be a filament and/or a profile bar, in particular, a profile bar which has been pre-tailored in terms of length.

It is preferable for the conveying element to have a conveying region which, when moving in the conveying direction, is configured for acquiring the semi-finished product so as to convey the semi-finished product.

It is preferable for the conveying element to have a conveying region which, when moving counter to the conveying direction, is configured for being released from the semi-finished product in such a manner that the conveying region does not exert any conveying force in the conveying direction on the semi-finished product.

It is preferable for the conveying region to comprise a conveying edge and/or a conveying face. It is preferable for the conveying edge to be configured for acquiring the semi-finished product in a form-fitting manner It is preferable for the conveying face to be configured for acquiring the semi-finished product in a form-fitting and/or force-fitting manner It is preferable for the conveying face to have a friction pad for acquiring the semi-finished product in a force-fitting manner It is preferable for the conveying face to have a surface structure, for example a knurling, for acquiring the semi-finished product in a form-fitting manner.

It is preferable for the conveying element to have a conveying opening for the semi-finished product through which the semi-finished product is able to be conveyed.

It is preferable for the conveying region, in particular the conveying edge and/or the conveying face, to be disposed on the conveying opening.

It is preferable for the conveying region, in particular the conveying edge and/or the conveying face, to delimit the conveying opening.

It is preferable for the conveying element to be configured as a conveying plate.

It is preferable for the conveying element to have a bearing region at one end of the conveying element, wherein the conveying element is pivotably mounted on the bearing region.

The conveying installation preferably comprises a plurality of conveying elements.

It is preferable for a first conveying element and a second conveying element to be disposed and able to be driven in such a manner that a uniform conveying movement of the semi-finished product is able to be generated by virtue of the movement of the conveying elements.

It is preferable for the conveying elements to be able to be driven in such a manner that the first conveying element and the second conveying element during the respective movement have, in each case, directions of movement which are at least, in part, counter to one another.

It is preferable for conveying elements that are disposed so as to be adjacent in the conveying direction to be configured in such a manner that in a movement in the conveying direction the semi-finished product is able to be acquired in such a manner that the semi-finished product is able to be rotated by an angle rate about the semi-finished product longitudinal axis thereof.

It is preferable for at least one conveying element to comprise a conveying region which is shaped in such a manner that the conveying region, when interacting with the semi-finished product, rotates the latter by an angle rate about the semi-finished product longitudinal axis thereof.

It is preferable for at least one conveying element, in particular at least one conveying region, to be configured in such a manner, that the angle rate is proportional to the range of movement of the conveying element.

The conveying installation preferably comprises a rotating mechanism which is configured for rotating the semi-finished product about the semi-finished product longitudinal axis.

It is preferable for the rotating mechanism to be configured for driving the conveying element in such a manner, that the semi-finished product is able to be rotated about the semi-finished product longitudinal axis.

It is preferable for the conveying element to be configured and/or disposed on the rotating mechanism in such a manner, that the conveying element is able to be moved to a state of rotational acquisition in which a rotating movement is able to be transmitted from the rotating mechanism to the semi-finished product.

It is preferable for the conveying element to be configured and/or disposed on the rotating mechanism in such a manner, that the conveying element is able to be moved to a rotationally released state in which no force which is suitable for rotating the semi-finished product about the semi-finished product longitudinal axis is able to be transmitted from the rotating mechanism to the semi-finished product.

It is preferable for the conveying element to be configured and/or disposed on the rotating mechanism in such a manner, that the conveying element is able to be moved to a longitudinally conveyed state in which a conveying movement of the semi-finished product in the conveying direction is enabled, wherein when moving in the conveying direction the longitudinally conveyed state is preferably able to be achieved by the conveying element before the state of rotational acquisition.

The invention achieves a tool head for assembly and use in an additive manufacturing machine, wherein the tool head comprises an entry region for a semi-finished product which is composed of a manufacturing material that is to be processed by the additive manufacturing machine and has a semi-finished product longitudinal axis; an exit region which is configured for depositing molten manufacturing material on a printing bed so as to manufacture a component; as well as comprising a preferred conveying installation that is configured for conveying the semi-finished product from the entry region to the exit region and for holding the semi-finished product on the tool head.

The invention achieves an additive manufacturing machine which is configured for carrying out a molten layering method for manufacturing a component, in particular for an aircraft, wherein the manufacturing machine is configured for processing manufacturing material tailored so as to form profile bars, wherein the manufacturing machine comprises a preferred conveying installation for conveying the semi-finished product and/or a preferred tool head for processing the semi-finished product.

The most prevalent 3D printing application in the so-called fused filament fabrication (FFF) in which a thermoplastic filament is melted and applied to a printing bed uses plastics materials. The filament may contain additives or reinforcements. The filament cools down and re-solidifies on the printing bed.

The filament is typically provided as a coil which is assembled close to the printing head or on an immovable location of the 3D printer. The filament herein is fed to the printing head by way of an adequate guide system, for example a Bowden cable. This enables the use of comparatively long filaments but is associated with certain limitations in terms of the filaments used.

It can thus be a limitation that the filaments used have a rather small diameter (typically between 0.8 mm and less than 3 mm) so as to permit the winding and guiding by way of acceptable bending radii. The achievable deposition rates may be limited by virtue of the small diameter. Alternative methods such as, for example, the use of added yarns or in-situ impregnation, in particular by virtue of the additional complexity of the method, can be significantly more complex in terms of the parts quality obtainable.

By virtue of the continuous configuration of the filaments it may additionally be necessary to carry out a cutting operation for fiber-reinforced filaments, for example when a part cannot be generated in a single uninterrupted fiber path or filament path, respectively. While cutting devices of this type do exist, this approach may be less desirable because the cutting of the fibers may pose a limitation in terms of the continuous operation of the 3D printer. This applies, in particular, when materials such as carbon fibers are used.

In another case, the accumulation of degraded thermoplastic material at the exit of the printer nozzle may represent an issue.

Furthermore, the thicker the filament the longer the latter has to be heated (or the method has to be decelerated) so as to guarantee complete melting of the filament. The risk and the prevalence of degradation may increase on account thereof The degradation modifies the viscosity of the material, for example, such that the material can accumulate on the nozzle or be pushed into the component, this being undesirable and potentially compromising the printing quality. This is typically more critical in so-called "(endless) fiber reinforced printing" in which the cleaning of the nozzle is more complicated than in the case of an endless filament which cannot be cut directly at the nozzle.

A printing device for layered melting, with or without fiber reinforcement, is known per se and comprises a printing head which is disposed so as to be able to move relative to a printing bed. The printing head can contain a filament driving installation so as to, by means of a plurality of drive wheels, move a filament wound on a coil toward the hot end. A cutting device by which the filament can be chopped can be provided at a location which in the direction of material flow is ahead of the hot end. If required, a filament guide can be additionally interposed between the filament driving device and the hot end. A heating element which heats the filament to melting temperature and deposits the filament on the printing bed by way of an exit nozzle is located at the hot end.

The sequence and the functioning principle of the components may be different. The cutting device can also be dispensed with when no endless fiber reinforcement is used.

The concepts described herein relate to the field of 3D printing. The particular focus is on different types of 3D printing such as fused filament fabrication (FFF), additive layer manufacturing (ALM), or selective laser sintering (SLS). The concepts described herein are, in particular, focused on increasing the deposition rate, or the positioning rate, respectively, in the printing process using non-reinforced and reinforced materials. This can, in particular, also relate to the so-called endless fiber reinforcements in which the length of the fiber corresponds substantially to the extent of the semi-finished product to be processed, or to the component made therefrom, respectively. The measures discussed herein are particularly suitable for the not previously published German patent application 10 2019 108 123.8.

BRIEF DESCRIPTION OF THE DRAWINGS

Exemplary embodiments will be explained in greater detail on the basis of the attached schematic drawings, in which.

DETAILED DESCRIPTION OF THE PREFERRED EMBODIMENTS

Figure 1:
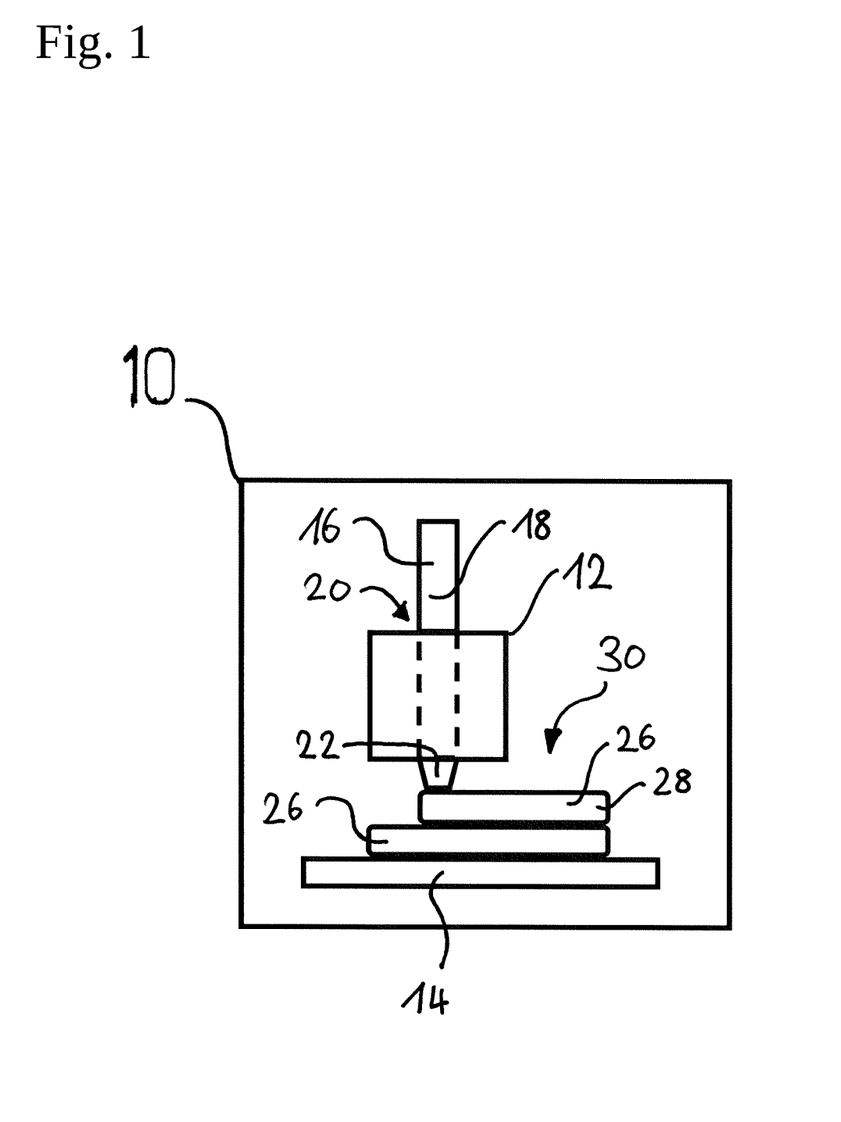
FIG. 1 shows an exemplary embodiment of an additive manufacturing machine.

Reference hereunder is made to FIG. 1 which schematically shows an exemplary embodiment of an additive manufacturing machine 10. The additive manufacturing machine 10 has a tool head 12 which is disposed so as to be able to move relative to a printing bed 14. The relative movement between the tool head 12 and the printing bed 14 herein can result from a movement of the tool head as well as from a movement of the printing bed.

The tool head 12, by means of a conveying installation 24, is configured for conveying a semi-finished product 16 which is composed of a manufacturing material and has a semi-finished product longitudinal axis, for example a profile bar 18 having a profile bar longitudinal axis, from an entry region 20 to an exit region 22.

The entry region 20 is configured for receiving the profile bar 18 and for feeding the latter to the conveying installation 24. The conveying installation 24, by virtue of control commands, conveys the profile bar 18 to the exit region 22 where the profile bar 18 is heated so as to melt, and thereafter is deposited on the printing bed 14 or on an already existing component layer 26 so as to thereafter form a further component layer 28 and successively form the desired component 30.

Figure 2:
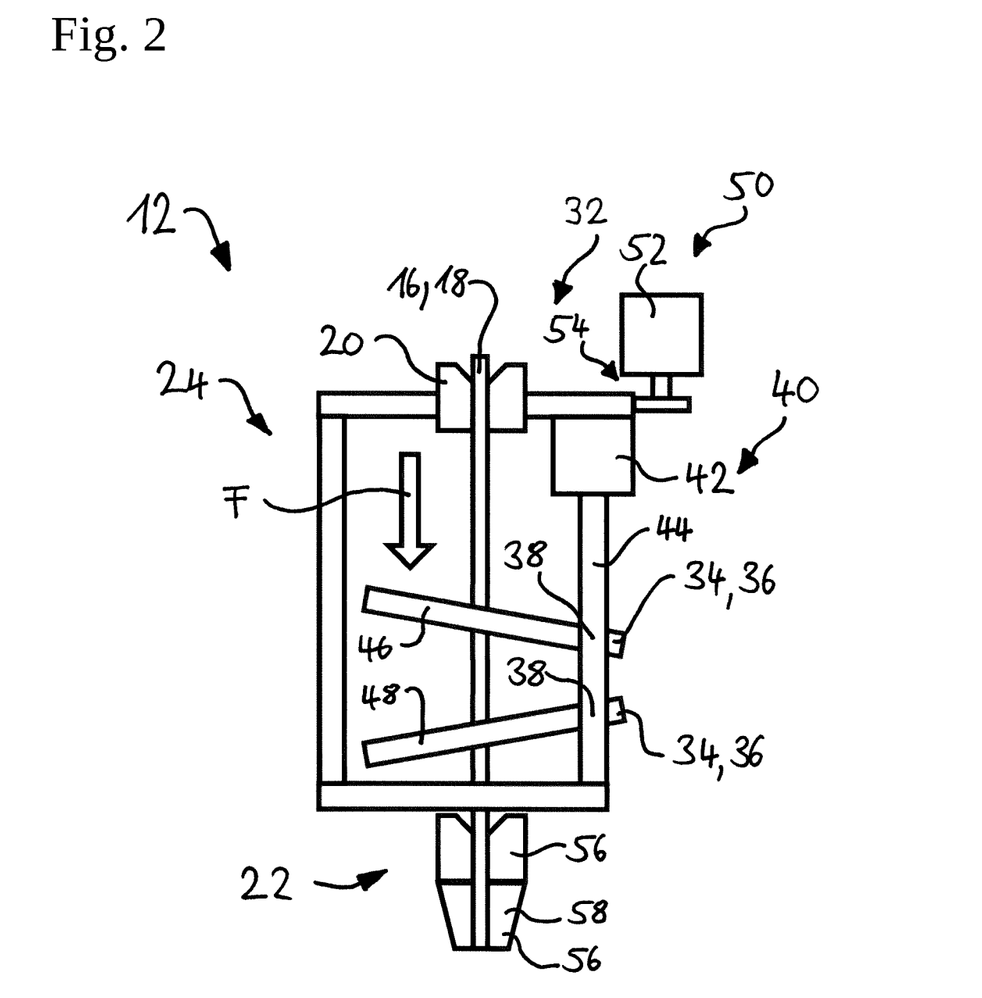
FIG. 2 shows an exemplary embodiment of a tool head.

Reference hereunder is, in particular, made to FIG. 2 which illustrates in more detail the tool head 12, or the conveying installation 24, respectively.

The conveying installation 24 has a longitudinal conveying mechanism 32. The longitudinal conveying mechanism 32 is configured for conveying the profile bar 18 along a conveying direction F from the entry region 20 to the exit region 22.

The longitudinal conveying mechanism 32 comprises at least one conveying element 34. The conveying element 34 is preferably configured as a conveying plate 36. The conveying element 34 at one end has a bearing region 38 on which the conveying element 34 is pivotably mounted.

The longitudinal conveying mechanism 32 furthermore has a longitudinal conveying drive installation 40. The longitudinal conveying drive installation 40 is configured for driving the at least one conveying element 34. The longitudinal conveying drive installation 40 is, in particular, configured for driving each conveying element 34 individually or collectively in groups. To this end, the longitudinal conveying drive installation 40 can have one or a plurality of longitudinal conveying actuators 42 and/or one or a plurality of longitudinal conveying gearbox installations 44.

As can be seen from FIG. 2, the longitudinal conveying mechanism 32 presently comprises a first conveying element 46 and a second conveying element 48. The first conveying element 46 and the second conveying element 48 are preferably able to be driven in such a manner that the first conveying element 46 and the second conveying element 48 can carry out pivoting movements in opposite directions. In other words, the first conveying element 46 and the second conveying element 48 are operatively connected to the longitudinal conveying drive installation 40 in such a manner that the second conveying element 48 is driven in the conveying direction F when the first conveying element 46 is pivoted counter to the conveying direction F.

The conveying installation 24 can furthermore comprise a rotating mechanism 50. The rotating mechanism 50 is configured for driving the longitudinal conveying mechanism 32, in particular each conveying element 34, in such a manner that the profile bar 18 can be rotated about the profile bar longitudinal axis thereof The rotating mechanism comprises a rotary actuator 52 which preferably, by means of a rotary gearbox installation 54, is mechanically coupled to the longitudinal conveying mechanism 32, or to the conveying element 34, respectively. The exit region preferably comprises a heating region 56 so as to melt the profile bar 18. The exit region 22 can furthermore have an exit nozzle 58 which is configured for applying the manufacturing material obtained from the profile bar 18 to the printing bed 14 or to the component layer 26, so as to shape the component 30 layer-by-layer.

Figure 3:
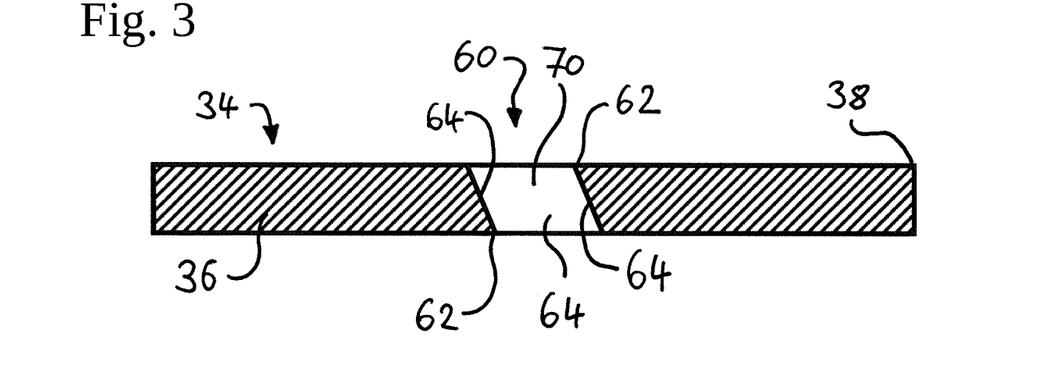
FIG. 3 to FIG. 5 show exemplary embodiments of conveying elements.
Figure 4:
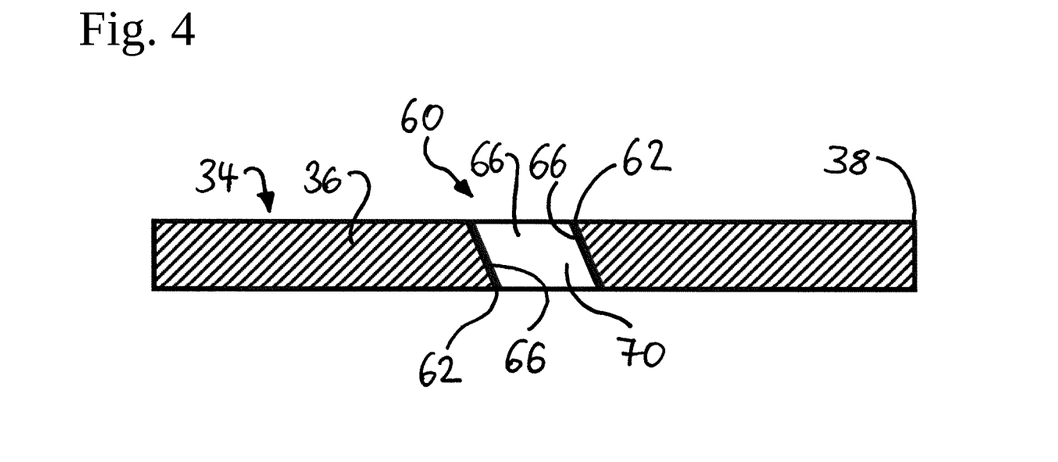
Figure 5:
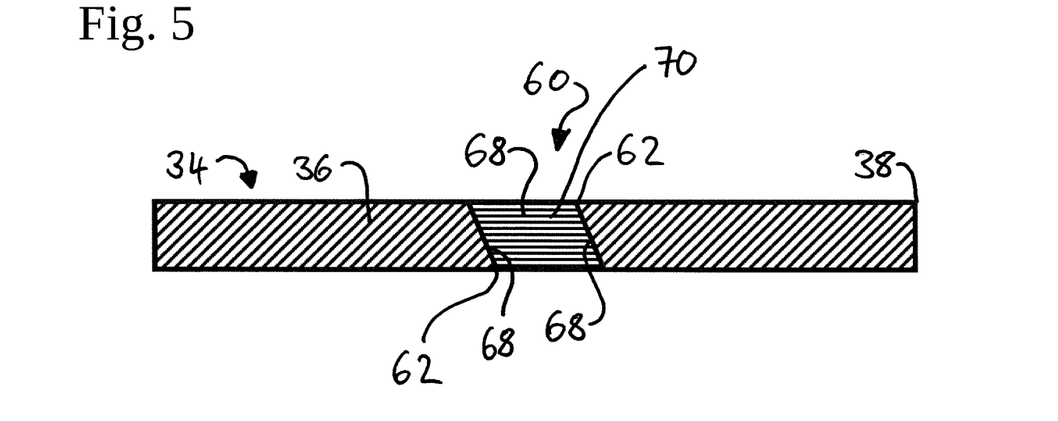

Reference hereunder is made to FIGS. 3 to 5 which show exemplary embodiments of the conveying element 34 in a cross-sectional view.

The conveying element 34 is preferably configured as a conveying plate 36. The conveying element 34 moreover has a conveying region 60. The conveying region 60 is configured for acquiring the profile bar 18 in a form-fitting and/or force-fitting manner The conveying region 60 can have one or a plurality of conveying edges 62 so as to acquire the profile bar 18 in a form-fitting manner The conveying edges 62 can lodge in the external circumferential face of the profile bar 18 and thus acquire the profile bar 18 in a form-fitting manner The conveying region 60 can furthermore have a conveying face 64 so as to acquire the profile bar 18 in a form-fitting and/or force-fitting manner In order for the force-fitting connection to the profile bar 18 to be improved, the conveying face 64 can have an elastomer coating 66, for example, as is illustrated in FIG. 4. Alternatively or additionally, the conveying face 64 can have a knurling 68 as is illustrated in more detail in FIG. 5.

The conveying region 60 can moreover have a conveying opening 70 which is dimensioned such that the profile bar 18 can be transported through the conveying opening 70. The conveying opening 70 preferably runs obliquely through the conveying element 34. The conveying opening 70 can be delimited by the conveying edge 62 and/or the conveying face 64.

The conveying region 60, in particular the conveying opening 70, can be shaped in such a manner that the conveying region 60, or the conveying opening 70, respectively, interacts with the profile bar 18 such that the profile bar, when transported, by virtue of the shaping of the conveying region 60 is rotated by an angle rate about the profile bar longitudinal axis thereof.

For example, the profile bar 18 can have a circular cross section which interacts with a conveying region 60 of elliptic shape, for example. An interaction of a profile bar 18 which has an elliptic cross section is also conceivable. The profile bar 18 can furthermore have a square or rectangular cross section which can interact with an elliptic, circular, or rectangular, or square conveying region 60, such that the profile bar 18 is rotated about the profile bar longitudinal axis thereof.

The functioning mode of the conveying installation 24 will be explained in more detail hereunder by means of FIGS. 6 to 9.

Figure 6:
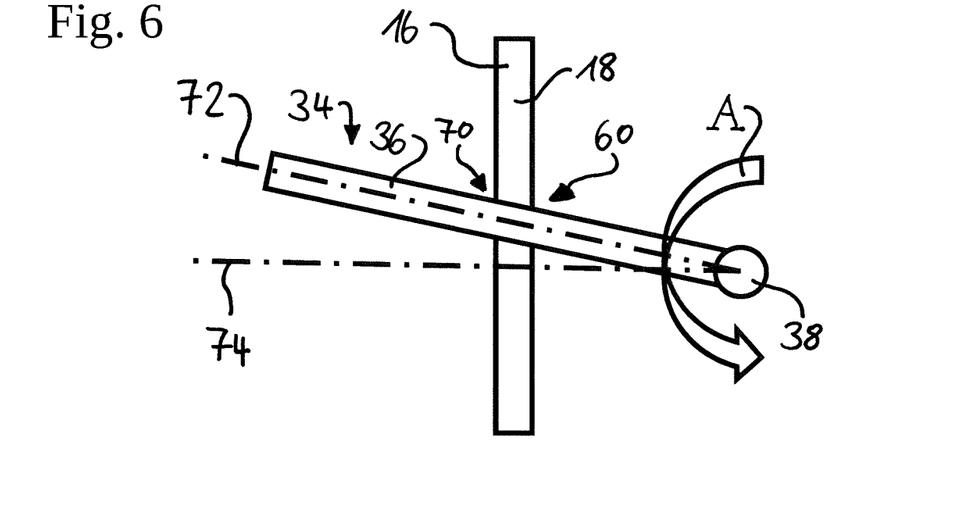
FIG. 6 to FIG. 9 show detailed views of a conveying installation in various states.

As is illustrated in FIG. 6, the conveying element 34 is initially in a rotationally released state. The conveying element 34 in the rotationally released state in any case does not acquire the profile bar 18 in such a manner that the profile bar 18 carries out a rotation about the profile bar longitudinal axis thereof. The conveying element 34 in the rotationally released state is preferably completely released from the profile bar 18. In other words, the conveying element 34 and the profile bar 18 in the rotationally released state are preferably without mutual contact. As is furthermore illustrated in more detail in FIG. 6, the conveying element is pivoted in the conveying direction F (arrow A) until the conveying element acquires the profile bar 18.

Figure 7:
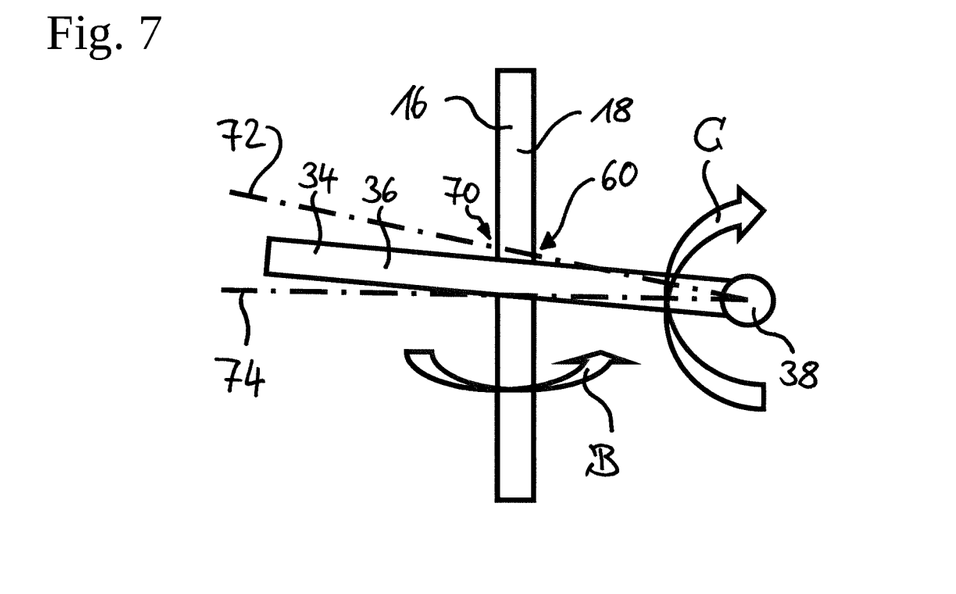

As is illustrated in more detail in FIG. 7, the conveying element 34 thereafter acquires the profile bar 18 in such a manner that the profile bar 18 is able to be rotated about the profile bar longitudinal axis thereof by an angle rate (arrow B). The conveying element 34 is in the state of rotational acquisition. A transmission of force from the conveying element 34 to the profile bar 18 is possible in the state of rotational acquisition. The rotation of the profile bar 18 can thus be performed by the rotating mechanism 50 in that the rotating mechanism 50 drives the conveying element 34, on the one hand On the other hand, the profile bar 18 can also be induced to rotate about the profile bar longitudinal axis thereof on account of the special shaping of the conveying element 34, or of the conveying region 60, respectively. In this case, the rotating mechanism 50 can be dispensed with. The rotating mechanism 50 may nevertheless be provided in a complementary manner.

Once the conveying element 34 has moved from the rotationally released initial position 72 thereof to the terminal position 74 thereof, the conveying element 34 can be pivoted counter to the conveying direction F (arrow C), wherein the conveying element 34 is released from the profile bar 18 and sets the latter free.

Figure 8:
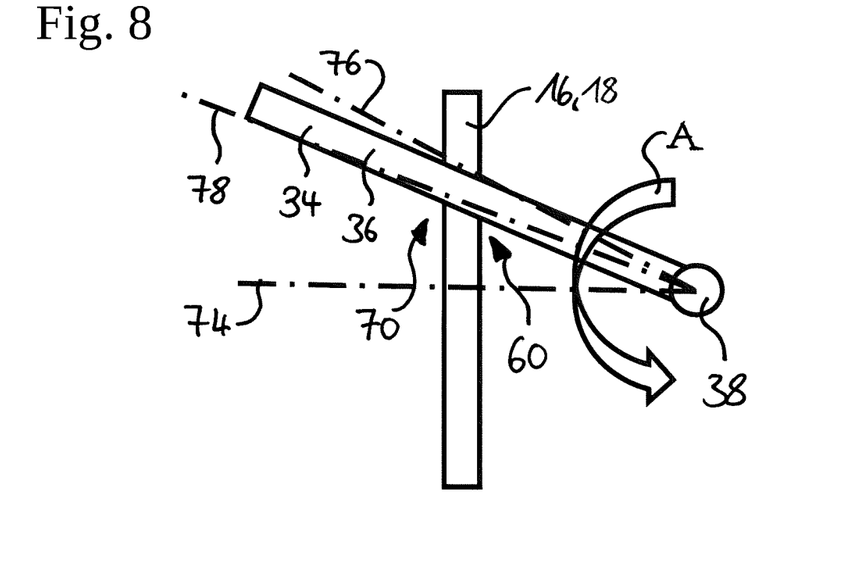
Figure 9:
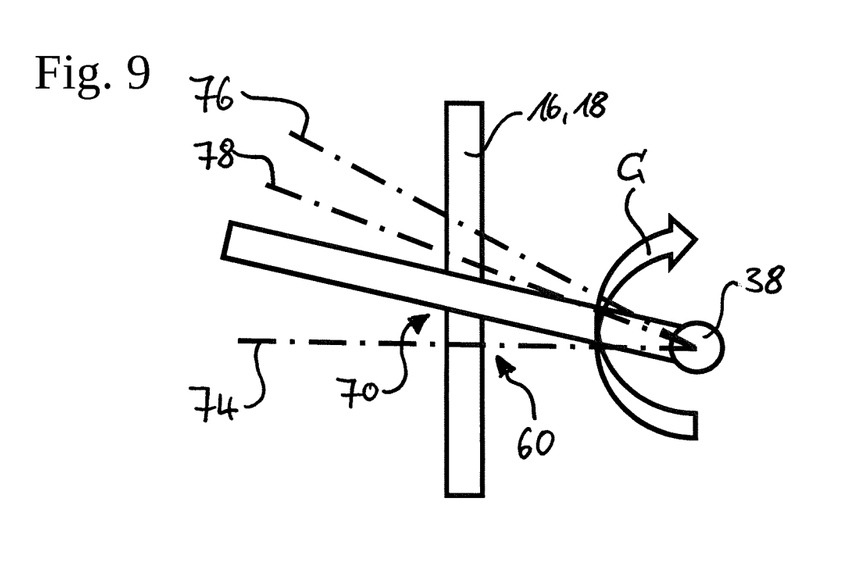

As is illustrated in more detail in FIG. 8, the conveying element 34 initially pivots (arrow A) from a conveying initial position 76 to a conveying acquisition position 78 in which the conveying element 34 acquires the profile bar 18 in such a manner that a sufficient transmission of force in the conveying direction F is possible such that the profile bar 18 in the movement of the conveying element 34 from the conveying acquisition position 78 to the terminal position 74 is correspondingly moved onward in the conveying direction F.

In the reverse pivoting (arrow C) of the conveying element 34 from the terminal position 74 thereof in the direction toward the conveying initial position 76, the conveying element 34, in particular by virtue of the shaping of the conveying region 60, is released from the profile bar 18 such that the profile bar 18 is not moved any further. The procedure recommences in the reverse pivoting from the conveying initial position 76, conveying the profile bar 18 piece-by-piece in the conveying direction F.

The conveying acquisition position 78 can preferably be associated with the state of rotational acquisition of the conveying element 34.

As has already been indicated in FIG. 2, a plurality of conveying elements 34 are preferably provided, which by alternating activation can be operated in such a manner that a uniform movement of the profile bar 18 in the conveying direction results, despite the profile bar 18 being moved only in portions by each conveying element 34.

It is to be noted that a combination of even more than two conveying elements 34 can be used, the combination of conveying elements 34 being adapted to the application. In other words, conveying elements 34 which are exclusively shaped such that conveying of the profile bar 18 takes place in the conveying direction F can be provided, while other conveying elements 34 which initiate a rotation of the profile bar 18 about the profile bar longitudinal axis thereof and simultaneously cause conveying of the profile bar 18 in the conveying direction F are provided.

By virtue of the measures described above, the profile bar 18 can be moved in the conveying direction F by pivoting movements of the conveying elements 34. At least two conveying elements 34, in particular in the form of conveying plates 36, are preferably provided for continuous uniform conveying of the profile bar 18. The conveying elements 34 contain conveying openings 70, for example bores. The conveying plates 36, embodied so as to be metallic, for example, on one side can be pivoted and rotated about an axis. By activating a plurality of conveying elements 34 in an opposing cycle, at least part of the plurality of conveying elements 34 is preferably in direct contact with the profile bar 18 and pushes the latter in the direction of the exit nozzle 58, while other conveying elements 34 are moving back to the initial position 76 thereof The contact with the profile bar changes at the reversal point of the conveying plate 36 such that the profile bar 18 is moved onward. By adding further conveying plates 36 or conveying elements 34, respectively, a discrete rotation of the profile bar 18 can likewise take place so as to enable, in particular, the manufacturing material when depositing curved component portions. In particular, can take place by virtue of the dissimilar travel distances along the curvature radius from the inside to the outside such that the application can take place in a more homogeneous manner, so as to correspond to the fiber length.

Summarizing, it is to be stated that the speed in 3D printing can be significantly increased by way of the measures described above, since slipping of the conveying elements, for example by virtue of contaminations, can be avoided by virtue of the design embodiment of the transport mechanism. Furthermore, improved transmission of force from the conveying elements to the profile bars can take place such that the reliable conveying of the manufacturing material for the 3D printing can be maintained in the case of an increased resistance to movement.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

10 Additive manufacturing machine
12 Tool head
14 Printing bed
16 Semi-finished product
18 Profile bar
20 Entry region
22 Exit region
24 Conveying installation
26 Component layer
28 Further component layer
30 Component
32 Longitudinal conveying mechanism
34 Conveying element
36 Conveying plate
38 Bearing region
40 Longitudinal conveying drive installation
42 Longitudinal conveying actuator
44 Longitudinal conveying gearbox installation 46 First conveying element
48 Second conveying element
50 Rotating mechanism
52 Rotary actuator
54 Rotary gearbox installation
56 Heating region
58 Exit nozzle
60 Conveying region
62 Conveying edge
64 Conveying face
66 Elastomer coating
68 Knurling
70 Conveying opening
72 Rotationally released initial position
74 Terminal position
76 Conveying initial position
78 Conveying acquisition position
F Conveying direction

What is claimed is:

1. A conveying installation for an additive manufacturing machine,
wherein the conveying installation is configured to convey a semi-finished product which is composed of a manufacturing material that is to be processed by the additive manufacturing machine and has a semi-finished product longitudinal axis,
wherein the conveying installation comprises a longitudinal conveying mechanism, which for conveying the semi-finished product along a conveying direction which is parallel to the semi-finished product longitudinal axis, is configured such that when moving in the conveying direction, the semi-finished product is able to be acquired by virtue of a periodic movement of at least one conveying plate, and when moving counter to the conveying direction is able to be released from the semi-finished product, so as to move the semi-finished product in the conveying direction,
wherein the conveying installation further comprises at least one of:
the conveying plate has a conveying region which, when moving in the conveying direction, is configured to acquire the semi-finished product to convey the semi-finished product, and/or
the conveying plate has a conveying region which, when moving counter to the conveying direction, is configured to be released from the semi-finished product such that the conveying region does not exert any conveying force in the conveying direction on the semi-finished product;
wherein the conveying plate has a conveying opening for the semi-finished product through which the semi-finished product is able to be conveyed, and the conveying region is disposed on the conveying opening, or the conveying region delimits the conveying opening,
wherein the conveying plate at one end of the conveying plate has a bearing region,
wherein the conveying plate is pivotably mounted on the bearing region and configured to pivot about the bearing region.

2. The conveying installation as claimed in claim 1, comprising a plurality of conveying plates,
wherein a first conveying plate and a second conveying plate are disposed and able to be driven such that a uniform conveying movement of the semi-finished product is able to be generated by virtue of a movement of the conveying plates,
wherein the conveying plates are able to be driven such that the first conveying plate and the second conveying plate during the respective movement have, in each case, directions of movement which are at least in part counter to one another.

3. The conveying installation as claimed in claim 1, comprising a plurality of conveying plates,
wherein conveying plates that are disposed so as to be adjacent in the conveying direction are configured such that the semi-finished product is able to be acquired such that in a movement in the conveying direction the semi-finished product is able to be rotated by an angle rate about the semi-finished product longitudinal axis thereof,
wherein the at least one conveying plate comprises a conveying region which is shaped such that the conveying region, when interacting with the semi-finished product, rotates the semi-finished product by the angle rate about the semi-finished product longitudinal axis thereof.

4. The conveying installation as claimed in claim 3, wherein the at least one conveying plate is configured in such a manner that the angle rate is proportional to a range of movement of the at least one conveying plate.

5. The conveying installation as claimed in claim 1, comprising a rotating mechanism which is configured to rotate the semi-finished product about the semi-finished product longitudinal axis.

6. The conveying installation as claimed in claim 5, wherein the rotating mechanism is configured to drive the conveying plate such that the semi-finished product is able to be rotated about the semi-finished product longitudinal axis.

7. The conveying installation as claimed in claim 5, wherein the conveying plate is at least one of configured and disposed on the rotating mechanism such that the conveying plate is able to be moved to a state of rotational acquisition in which a rotating movement is able to be transmitted from the rotating mechanism to the semi-finished product.

8. The conveying installation as claimed in claim 5, wherein the conveying plate is at least one of configured and disposed on the rotating mechanism such that the conveying plate is able to be moved to a rotationally released state in which no force suitable to rotate the semi-finished product about the semi-finished product longitudinal axis is able to be transmitted from the rotating mechanism to the semi-finished product.

9. The conveying installation as claimed in claim 5, wherein the conveying plate is at least one of configured and disposed on the rotating mechanism such that the conveying plate is able to be moved to a longitudinally conveyed state in which a conveying movement of the semi-finished product in the conveying direction is enabled.

10. The conveying installation as claimed in claim 9, wherein when the conveying plate is moving in the conveying direction, the longitudinally conveyed state is achieved by the conveying plate before a state of rotational acquisition.

11. A tool head for assembly and use in an additive manufacturing machine,
wherein the tool head comprises:
an entry region for a semi-finished product which is composed of a manufacturing material that is to be processed by the additive manufacturing machine and has a semi-finished product longitudinal axis;

an exit region which is configured for depositing molten manufacturing material on a printing bed so as to manufacture a component;
a conveying installation as claimed in claim 1 configured to convey the semi-finished product from the entry region to the exit region and for holding said semi-finished product on the tool head.

12. An additive manufacturing machine configured to carry out a molten layering method for manufacturing a component,
wherein the manufacturing machine is configured to process manufacturing material tailored to form profile bars,
wherein the manufacturing machine comprises a tool head as claimed in claim 11 to process the semi-finished product.

13. An additive manufacturing machine configured to carry out a molten layering method for manufacturing a component,
wherein the manufacturing machine is configured to process manufacturing material tailored to form profile bars,
wherein the manufacturing machine comprises a conveying installation as claimed in claim 1 to convey the semi-finished product.

* * * * *